(12) United States Patent
Kogure et al.

(10) Patent No.: US 8,729,763 B2
(45) Date of Patent: May 20, 2014

(54) ROTOR AND IPM MOTOR

(75) Inventors: Tomonari Kogure, Anjyo (JP); Hiroko Kurihara, Toyota (JP)

(73) Assignee: Toyota Jidosha Kabushiki Kaisha, Toyota-shi, Aichi-ien (JP)

( * ) Notice: Subject to any disclaimer, the term of this patent is extended or adjusted under 35 U.S.C. 154(b) by 0 days.

(21) Appl. No.: 13/809,910

(22) PCT Filed: Jul. 23, 2010

(86) PCT No.: PCT/JP2010/062457
§ 371 (c)(1),
(2), (4) Date: Jan. 14, 2013

(87) PCT Pub. No.: WO2012/011191
PCT Pub. Date: Jan. 26, 2012

(65) Prior Publication Data
US 2013/0113328 A1 May 9, 2013

(51) Int. Cl.
H02K 21/12 (2006.01)
(52) U.S. Cl.
USPC ............................... 310/156.53; 310/156.57
(58) Field of Classification Search
USPC ....................................... 310/156.53–156.57
See application file for complete search history.

(56) References Cited

U.S. PATENT DOCUMENTS

| | | | |
|---|---|---|---|
| 6,121,706 A | 9/2000 | Nashiki et al. | |
| 7,362,025 B2 * | 4/2008 | Utaka | 310/156.57 |
| 7,436,096 B2 * | 10/2008 | Guven et al. | 310/156.53 |
| 7,612,480 B2 * | 11/2009 | Fujii et al. | 310/156.53 |
| 2002/0145353 A1 * | 10/2002 | Kimura et al. | 310/156.57 |
| 2006/0028082 A1 * | 2/2006 | Asagara et al. | 310/156.53 |
| 2007/0096578 A1 * | 5/2007 | Jahns et al. | 310/156.53 |
| 2008/0136281 A1 | 6/2008 | Fujii et al. | |
| 2009/0140592 A1 * | 6/2009 | Rahman et al. | 310/156.53 |
| 2009/0140593 A1 * | 6/2009 | Kaiser et al. | 310/156.53 |
| 2010/0079026 A1 * | 4/2010 | Han et al. | 310/156.53 |
| 2010/0109467 A1 | 5/2010 | Aota et al. | |
| 2010/0213781 A1 * | 8/2010 | Rahman et al. | 310/156.56 |
| 2010/0219712 A1 * | 9/2010 | Kogure et al. | 310/156.43 |

FOREIGN PATENT DOCUMENTS

| | | |
|---|---|---|
| CN | 1835340 | 9/2006 |
| CN | 101617457 | 12/2009 |

(Continued)

*Primary Examiner* — Thanh Lam
(74) *Attorney, Agent, or Firm* — Finnegan, Henderson, Farabow, Garrett & Dunner, LLP

(57) ABSTRACT

Disclosed are a rotor and an IPM motor capable of avoiding concentration of flux on a corner area of a magnet on the stator side, leading to reduction in demagnetizing field and accordingly reduction in a required coercive force, and reduction in the usage amount of dysprosium or the like and accordingly reduction in manufacturing cost. In a slot bored in a rotor core of a rotor making up a motor, at least one of a slot face on a center side of the rotor core and a slot face facing this slot face is formed a protrusion or a concave groove and the magnet to be inserted in the slot includes at least one of a concave groove and a protrusion to be engaged with the protrusion or the concave groove of the slot face at a position corresponding to the protrusion or the concave groove formed in the slot. Then, these concave groove and protrusion are engaged to form an engagement part. This engagement part aligns and fixes the magnet in the rotor, and a flux barrier is formed between a lateral side face of the magnet and a slot face, the flux barrier having a same thickness as a thickness of the magnet.

3 Claims, 8 Drawing Sheets

(56) References Cited

FOREIGN PATENT DOCUMENTS

| JP | 2000-050542 | 2/2000 |
|----|-------------|--------|
| JP | 2000-278896 | 10/2000 |
| JP | 2004-260920 | 9/2004 |
| JP | 2006-109700 | 4/2006 |
| JP | 2007-97290 | 4/2007 |
| JP | 2007-336671 | 12/2007 |
| JP | 2008-148482 | 6/2008 |

* cited by examiner (a)

(b)

(a)

(b)

(c)

(a)

(b)

(a)

(b)

(a)

(b)

(a)

(b)

(a)

(b)

ROTOR AND IPM MOTOR

CROSS-REFERENCE TO RELATED APPLICATIONS

This application is a national phase application of International Application No. PCT/JP2010/062457, filed Jul. 23, 2010, the content of which is incorporated herein by reference.

TECHNICAL FIELD

The present invention relates to a rotor making up a motor and an IPM rotor provided with this rotor.

BACKGROUND ART

An interior permanent magnet motor (hereinafter called an IPM motor) including a permanent magnet embedded inside a rotor can generate reluctance torque as well as magnet torque resulting from attractive force/repulsive force between a coil and the permanent magnet, and therefore compared with a surface permanent magnet motor (SPM motor) including a permanent magnet attached to an outer periphery of a rotor, the IPM motor has higher torque and higher efficiency. Therefore such an IPM motor is used as driving motors in hybrid vehicles, electric vehicles and the like requiring high output performance. Typically used permanent magnets therefore include sintered magnets of rare-earth magnets, ferrite magnets, alnico magnets and the like.

In order to realize smooth insertion of a permanent magnet into a slot formed in a rotor core and to avoid damage of the permanent magnet at a slot edge, in general, the IPM motor is designed so that the slot is horizontally longer and has a larger dimension than the permanent magnet, and a space defined by a lateral side face of the magnet and a slot face is filled with resin of a non-magnetic material, followed by curing of the resin, thus fixing the permanent magnet.

Referring to FIG. 8, such a state of a magnet fixed inside a slot is described below.

FIG. 8a partially shows a stator S provided with a coil C around a tooth T and a rotor R including permanent magnets PM in a predetermined number embedded therein, the rotor R being arranged rotatably inside the stator S to make up a conventional IPM motor.

At a rotor core making up the rotor R is bored a rotor slot RS to contain the permanent magnets PM, and a lateral side of the rotor slot is filled with non-magnetic resin F1, F2 to fix the permanent magnet PM. In the illustrated example, two permanent magnets PM are arranged like a substantially V-letter shape to form one magnetic pole.

Meanwhile, the resin F1, F2 should naturally fix the permanent magnets PM from the lateral sides thereof in the rotor slots RS, and further has a function as a flux barrier to suppress flux leakage from the permanent magnets PM. As a shape to suppress the flux leakage MJ from the permanent magnets PM, the resin F1, F2 has a shape as shown in FIGS. 8a and 8b, for example.

Herein, as is easily understood, the flow of flux J from the stator side into a permanent magnet PM provided in the rotor tends to pass through the rotor core having high magnetic permeability, and therefore the flux J entering from the stator side tends to concentrate on a corner area of the permanent magnet PM on the stator side.

Referring to FIG. 8b, such a tendency is described below. The resin F1, F2 on the lateral sides of a permanent magnet PM have thicknesses t1' and t1" at a part in contact with the permanent magnet PM that are smaller than the thickness t1 of the permanent magnet PM. That is, since the slot is bored in this area to have dimensions and shapes for resin F1, F2 having the thicknesses t1' and t1" smaller than the thickness t1, the permanent magnet PM can be aligned at their lateral edges K1 and K2.

If the resin F1, F2 has a thickness at a part in contact with the permanent magnet PM larger than the thickness of the permanent magnet PM, then the permanent magnet PM cannot be aligned in the slot, which may influence on magnetic characteristics of the motor.

In this way, the permanent magnet PM can be securely aligned in a sophisticated manner at the lateral edges K1 and K2. However, since the resin F1, F2 having such dimensions and shapes is formed on the lateral sides of the permanent magnet PM, the resin F1, F2 will have parts therein with thicknesses t2 and t3 that are significantly smaller than the thickness t1 of the permanent magnet PM.

Then, as stated above, since the flux J from the stator tends to pass through the rotor core having high magnetic permeability, the flux J likely passes through not the permanent magnetic PM having the thickness t1 but the routes through the thicknesses t2 and t3 in the resin F1, F2 that are the shortest routes to be reachable to the rotor core having high magnetic permeability. Then, during the course of passing through these routes, the flux J will concentrate on and pass through the corner areas of the permanent magnet PM on the stator side, thus increasing demagnetizing field that acts on the corner area of the permanent magnet PM on the stator side.

Herein the demagnetizing field is made up of the sum of internal magnetic field flowing from N pole to S pole inside the magnet and the above-stated external magnetic field entering from the stator side, among which the external side can be said to mainly decide the magnitude and the direction of the demagnetizing field.

In order to secure a desired coercive force against this demagnetizing field, there is a need to increase a coercive force of the magnet, especially at the corner areas on the stator side.

Then, as typical measure to improve this coercive force of a permanent magnet, the alloy composition making up the permanent magnet is partially replaced with Dy (dysprosium) or Tb (terbium) that are metals having high coercive force performance so as to increase anisotropy field of the metal compound and so increase the coercive force. However, the usage amount of dysprosium or terbium greatly exceeds the natural abundance ratio of rare-earth elements and additionally the estimated amount of commercially developed deposits is extremely low, and moreover the existing regions of the deposits are eccentrically located across the world, and therefore the necessity of strategy for these elements has been recognized.

Even if a coercive-force distribution magnet is manufactured including dysprosium or the like with the impregnation amount corresponding to a required coercive force varying with each part of a magnet, in order to give a coercive force to the magnet against high demagnetizing field, more dysprosium or the like has to used for the part, resulting in the failure to effectively reduce the usage amount of dysprosium or the like.

In view of such a present situation, the present inventors came up with the idea of a rotor capable of reducing demagnetizing field that might be generated in a magnet by modifying the shapes and the structures of both of a slot bored in the rotor and a magnet fixed in the slot, and accordingly capable of reducing a coercive force required for the magnet, and so reducing the usage amount of expensive rare metals used to increase coercive force performance of the magnet.

Conventionally Patent Document 1 discloses a technique for a rotor including a flux barrier in a L-letter shape in planar view formed at a corner of a slot.

This rotor is provided with the flux barrier in a L-letter shape in planar view at a corner of the slot, whereby cogging torque of the motor can be reduced. However, even in this configuration, the flux from the stator side as shown in FIG. 8b still tends to pass through this L-shaped flux barrier because this flux barrier also has a smaller thickness than the thickness of the permanent magnet. Therefore, demagnetizing field that might be generated at a corner area of the permanent magnet on the stator side still remains high, and it is still difficult to reduce the usage amount of dysprosium or the like used to secure a coercive force against this demagnetizing field.

Patent Document 1: JP Patent Publication (Kokai) No. 2000-278896 A

DISCLOSURE OF THE INVENTION

Problem to be Solved by the Invention

In view of the aforementioned problems, it is an object of the invention to provide a rotor capable of avoiding or alleviating the concentration of flux at a magnet contained in a slot of the rotor, and accordingly suppressing demagnetizing field that might be generated to reduce a required coercive force and so reducing the usage amount of rare metals to be used for improvement of the coercive force, thus enabling reduction in manufacturing cost of the magnet and reduction in manufacturing cost of the rotor and a motor, and to provide an IPM motor provided with such a rotor.

Means for Solving the Problem

In order to fulfill the aforementioned object, a rotor making up a motor of the present invention includes: a rotor core with a slots bored therein, the slot having a slot face on a center side of the rotor core and a slot face on a stator side facing the slot face on the center side and including at least one of a protrusion and a concave groove at least one of the slot faces; a magnet to be contained in the slot, the magnet including at least one of a concave groove and a protrusion to be engaged with the protrusion or the concave groove of the slot face; an engagement part so as to let the slot and the magnet engage at their concave groove and protrusion, the engagement part aligning and fixing the magnet in the rotor; and a flux barrier disposed between a lateral side face of the magnet and a slot face, the flux barrier having a same thickness as a thickness of the magnet.

In the rotor of the present invention, among slot faces making up a slot in which a magnet such as a permanent magnet forming a magnet pole is to be inserted, at least one of a slot face on a center side of the rotor core and a slot face on a stator side facing the slot face on the center side is formed a protrusion or a concave groove, and the magnet to be inserted in the slot includes at least one of a concave groove and a protrusion to be engaged with the protrusion or the concave groove of the slot face at a position corresponding to the protrusion or the concave groove of the slot. Then, these concave groove and protrusion are engaged to form an engagement part.

In this way, the magnet and the slot are engaged at the engagement part, whereby a flux barrier formed between a lateral side face of the magnet and a slot face can have a same thickness as a thickness of the magnet. Unlike the conventional rotor as shown in FIG. 8b where flux barriers (resin F1, F2) having a smaller thickness than the magnet is provided on lateral sides of the magnet so as to form edges K1, K2 for magnet alignment, a part of the flux barrier of this configuration has the same thickness as that of the magnet without these edges. Thereby, the flow of flux from the stator side passing through the flux barrier can be eliminated, and accordingly the concentration of the flux at a corner area of the magnet on the stator side can be avoided or alleviated.

The alleviation of the concentration of the flux from the stator side on a corner area of the magnet on the stator side leads to reduction in demagnetizing field in this area, and so a required coercive force can be reduced.

Note here that the concave groove and the protrusion formed at the magnet or the slot may have a shape of a rectangle or a square in planar view as well as a shape having smooth outline such as a semielliptical shape or a semicircular shape in planar view. Especially the concave groove and the protrusion having a smooth curved line such as a semielliptical shape (which means not having a corner) can avoid the damage of the protrusion when the magnet is inserted into the slot while engaging them.

The flux barrier may be made of low magnetic-permeability resin or air.

Even flux barriers made of air, for example, will not cause displacement or falling-off of the magnet from the slot because the permanent magnet is aligned and fixed in the fixed posture with the slot by the engagement part.

The magnet to be inserted into the slot may be a sintered magnet. Examples of the sintered magnet include a permanent magnet such as a rare-earth magnet, a ferrite magnet or an alnico magnet. Examples of the rare-earth magnet include a three-component system neodymium magnet containing iron and boron added to neodymium, a samarium cobalt magnet containing a two-component system alloy of samarium and cobalt, a samarium-iron-nitrogen magnet, a praseodymium magnet and the like. Among them, in the case of application of this sintered magnet to a driving motor of a hybrid vehicle or the like requiring high output, a rare-earth magnet is preferably used, having a high maximum energy product $(BH)_{max}$ than a ferrite magnet and an alnico magnet.

With this respect to this magnet is immersed dysprosium or the like whose usage amount has been adjusted so as to have a coercive force required for each part by grain boundary diffusion or the like, whereby a coercive force distribution magnet is formed, and such a magnet is inserted into the slot for fixing.

As a form of a magnetic pole formed at the rotor, two of the slots may be spaced with each other and may be bored at the rotor core in arrangement of a substantially V-letter shape, and in each of the two slots, the magnet may be aligned and fixed and the flux barrier may be formed, so as to form one magnetic pole.

The thus formed one magnetic pole including the two magnets in the arrangement of a substantially V-letter shape allows the flux entering from the stator side to flow smoothly along the V-letter magnet line shape in the rotor and allows a lot of reluctance torque to be obtained, and therefore a motor having excellent torque performance can be formed.

Both of the two magnets in the arrangement of a V-letter shape are aligned and fixed with their specific slots via the engagement parts, and are provided with flux barriers on their both sides, having the same thickness as that of the magnet.

The present inventors have found that this flux barrier configured to, in addition to partially having the same thickness as that of the magnet, have a width, i.e., the width from a part in contact with the magnet to the rotor core, to be set at the thickness of the magnet or larger can more effectively alleviate the concentration of flux from the stator at an outside corner area of the V letter between the corner areas on the magnet on the stator side.

Preferably, both of the two magnets in arrangement of a substantially V-letter shape each include the engagement part brought from a center position of the magnet closer to the other magnet.

The present inventors have found that, in two magnets in the arrangement of a substantially V-letter shape, maximum demagnetizing field tends to occur at a corner area on the outside of the V letter.

Then, one of the magnets is formed to have its engagement part brought closer to the other magnet from a center position of the magnet (the inner side of V), whereby the magnetic field distribution at the corner area on the outer side of the V letter on the stator side can be changed, so that the maximum value of the demagnetizing field can be reduced effectively and a part of the magnet giving the maximum value of the demagnetizing field can be changed.

The present invention further covers an IPM motor including the rotor and a stator.

According to a rotor of the present invention and an IPM motor provided with the rotor, flux entering from a stator does not concentrate especially on a corner area of a magnet provided in the rotor, and therefore demagnetizing field (maximum value thereof) in the magnet resulting from this external magnetic field can be reduced. Therefore the maximum value of the required coercive force can be reduced, and so the usage amount of dysprosium or the like can be reduced and the manufacturing cost of the rotor and the motor can be reduced.

Effects of the Invention

As is understood from the above description, according to a rotor of the present invention and an IPM motor provided with the rotor, a slot bored in the rotor and a magnet to be inserted therein are aligned and fixed via an engagement part including a concave groove and a protrusion formed at their corresponding positions, and a flux barrier formed between a lateral side face of the magnet and a slot face partially has a same thickness as a thickness of the magnet. This configuration can avoid the concentration of flux on a corner area of the magnet on the stator side, and demagnetizing field and accordingly a required coercive force can be reduced. As a result, the usage amount of dysprosium or the like can be reduced and accordingly the manufacturing cost can be reduced.

BRIEF DESCRIPTION OF THE DRAWINGS

FIG. 4(a) shows Comparative example model of a magnet and a slot and FIG. 4(b) is a contour figure of demagnetizing field obtained by magnetic analysis thereof.

FIG. 5(a) shows Example 1 model of a magnet and a slot and FIG. 5(b) is a contour figure of demagnetizing field obtained by magnetic analysis thereof.

FIG. 6(a) shows Example 2 model of a magnet and a slot and FIG. 6(b) is a contour figure of demagnetizing field obtained by magnetic analysis thereof.

FIG. 7(a) shows Example 3 model of a magnet and a slot and FIG. 7(b) is a contour figure of demagnetizing field obtained by magnetic analysis thereof.

MODE FOR CARRYING OUT THE INVENTION

The following describes embodiments of the present invention, with reference to the drawings. In the illustrated examples, two magnets are arranged in a substantially V-letter shape to form one magnetic pole. In another form, one magnet may be arranged so as to be perpendicular to the radial direction of the rotor, thus forming one magnetic pole.

Figure 1:
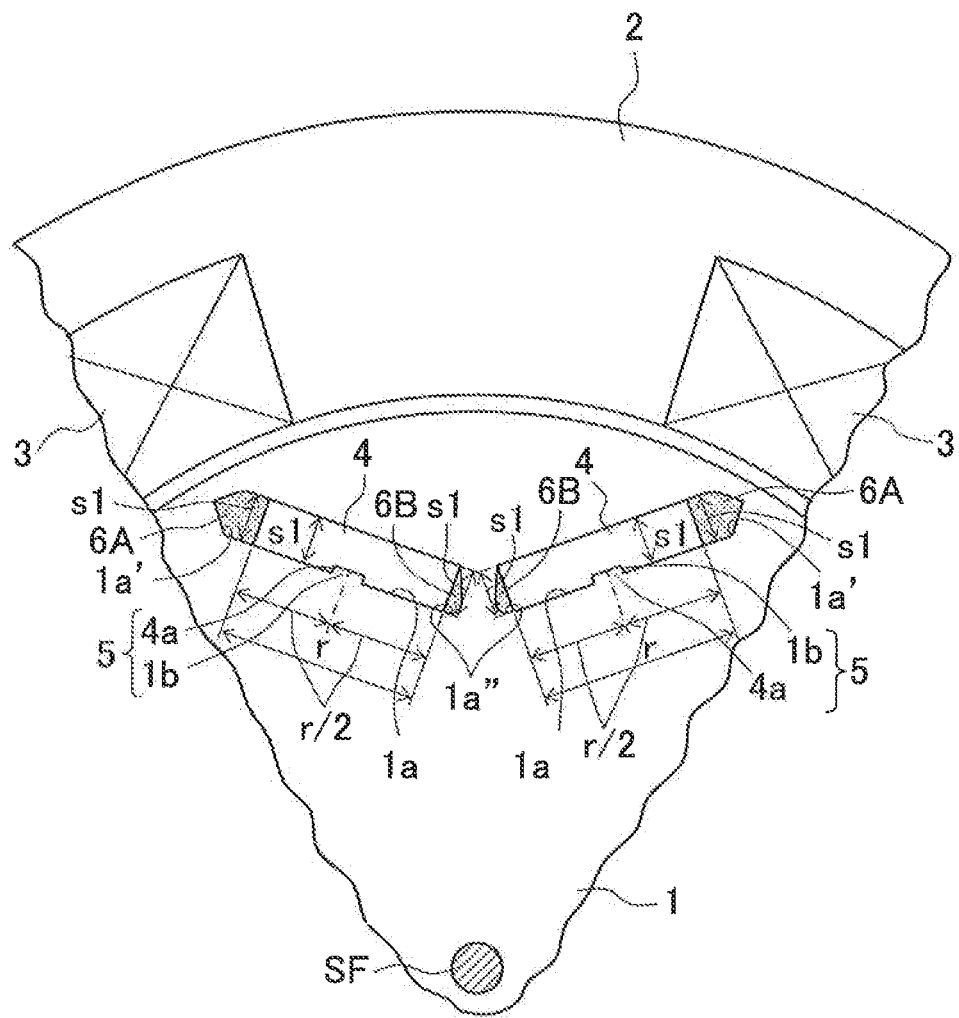
FIG. 1 is a schematic view partially showing a rotor and a stator making up an IPM motor of the present invention.

FIG. 1 is a schematic view partially showing a rotor and a stator making up an IPM motor of the present invention.

The IPM motor is configured so that a stator 2 made up of a lamination of magnetic steel sheets and the like includes an annular yoke and teeth protruding from this yoke inwardly in the radial direction, around these teeth are formed coils 3 via an insulation bobbin not illustrated, and inside the stator 2 is provided a rotor 1 rotatably around a shaft SF, the rotor 1 including a similar lamination of magnetic steel sheets and the like.

The rotor 1 includes two of the permanent magnets 4, 4 are arranged in a substantially V-letter shape in planar view so as to form one magnetic pole and slots 1a, each slot 1a containing one permanent magnet 4.

Note here that in the slot 1a is provided a protrusion 1b at a slot face on the rotor core center side, and each permanent magnet 4 has a concave groove 4a ditched therein to be fitted into the protrusion 1b at a position corresponding to the protrusion 1b when the permanent magnet 4 is contained in the slot 1a. Insertion of the permanent magnet 4 into the slot 1a while fitting the concave groove 4a into the protrusion 1b allows the permanent magnet 4 to be contained into the slot 1a. Then, in the posture where the permanent magnet 4 is completely contained in the slot 1a, an engagement part 5 where the concave groove 4a and the protrusion 1b are mutually engaged is formed, so that this engagement part 5 secures alignment and fixing of the permanent magnet 4 in the slot 1a.

The concave groove 4a of FIG. 1 is formed to have a rectangular shape in planar view, and is provided at a center position of the length r of the permanent magnet 4 in the longitudinal direction.

Further, each permanent magnet 4 is provided with slots 1a' and 1a" on the lateral sides of the magnet that are spaces defined by inner and outer lateral faces of the V-letter and the slot faces, and in the slots 1a' and 1a" are formed flux barriers 6A and 6B filled with low magnetic-permeability resin.

These flux barriers 6A and 6B have mutually different planar shapes because of the reasons to reduce flux leakage from the lateral sides and not to generate magnetic saturation at the lateral sides of the permanent magnet, for example. Each of the flux barriers 6A and 6B has a part having a same thickness s1 as that of the permanent magnet 4, more specifically, at a part in contact with the permanent magnet 4.

Figure 8:
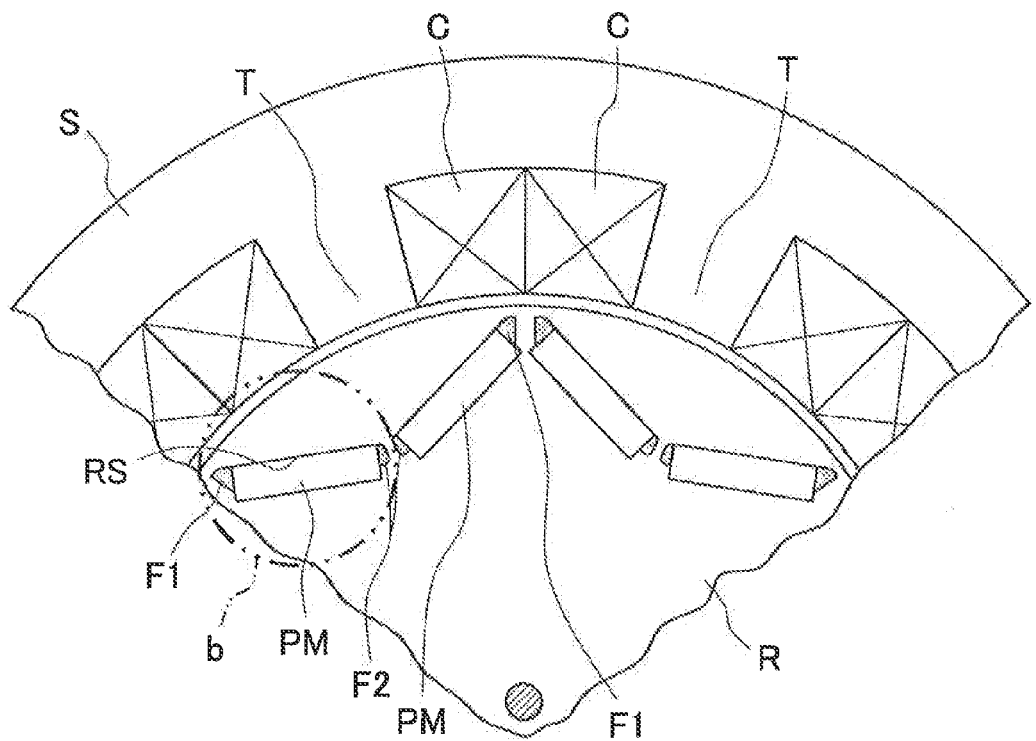
FIG. 8(a) is a schematic view partially showing a rotor and a stator making up a conventional IPM motor.
FIG. 8(b) is an enlarged view of part b of FIG. 8(a) describing the state where flux from a stator concentrates on a corner area of the magnet on the stator side.
Figure 8:
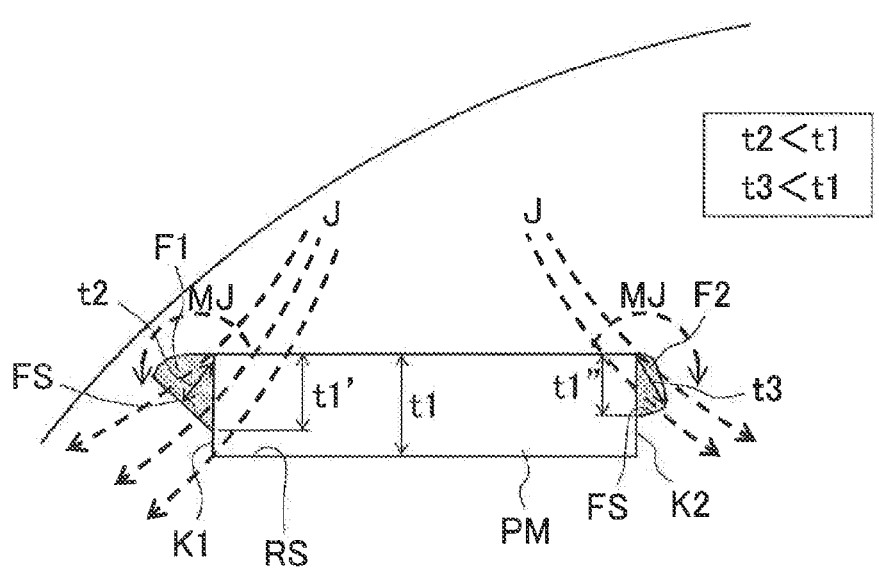

Differences between this rotor and the conventional rotor will become clear by a comparison with FIG. 8b. The flux barriers on the lateral sides of the permanent magnet PM shown in FIG. 8b do not have an area having the same thickness as the thickness t1 of the permanent magnet PM, and therefore the flux J from the stator concentrates on the corner area of the permanent magnet PM on the stator side.

On the other hand, the slots 1a" and 1a" on the lateral sides of the permanent magnet 4 shown in FIG. 1 have an area having the same thickness as the thickness s1 of the permanent magnet 4, and therefore flux entering from the stator will not reach the rotor core in the shortest distance even by passing through the flux barriers 6A and 6B. As a result, the concentration of flux trying to pass through the flux barriers 6A and 6B and the corner areas of the permanent magnet 4 can be solved.

Therefore, when the permanent magnet 4 is a coercive-force distribution magnet, there is no need to provide a coercive force area having an excessively high coercive force at the corner areas on the stator side. Accordingly, compared with the conventional coercive-force distribution magnet, the usage amount of dysprosium or the like can be reduced.

The permanent magnet 4 may be any one type of rare-earth magnets, ferrite magnets and alnico magnets. The rare-earth magnets may be any one type of a three-component system neodymium magnet containing iron and boron added to neodymium, a samarium cobalt magnet containing a two-component system alloy of samarium and cobalt, a samarium-iron-nitrogen magnet, a praseodymium magnet and the like.

The flux barriers may be made of air instead of resin. Even flux barriers made of air will not cause displacement or falling-off of the magnet from the slot because the permanent magnet 4 is aligned and fixed at the slot 1a by the engagement part 5.

Figure 2:
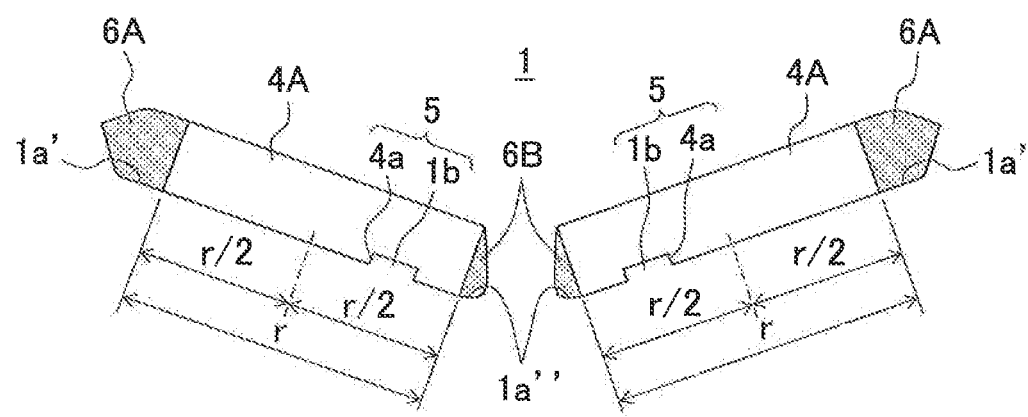
FIGS. 2(a), (b) are plan views showing other embodiments of a slot bored in a rotor and a magnet inserted therein.
Figure 2:
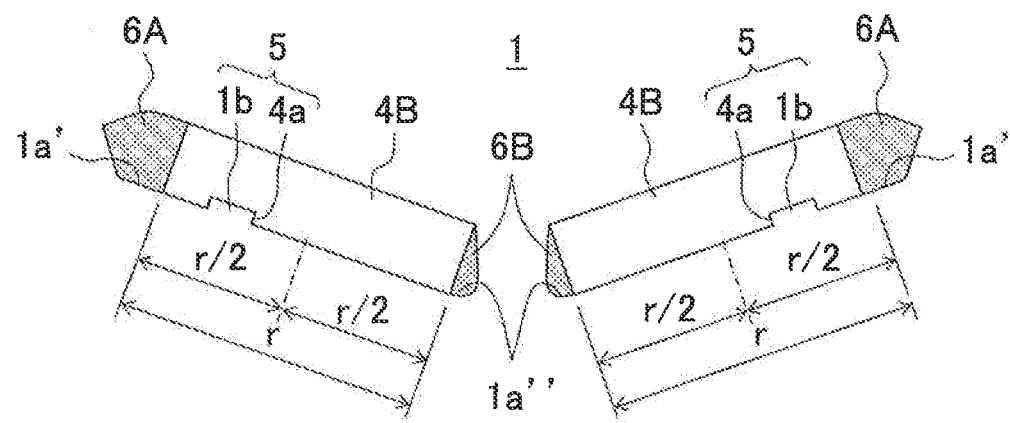
Figure 3:
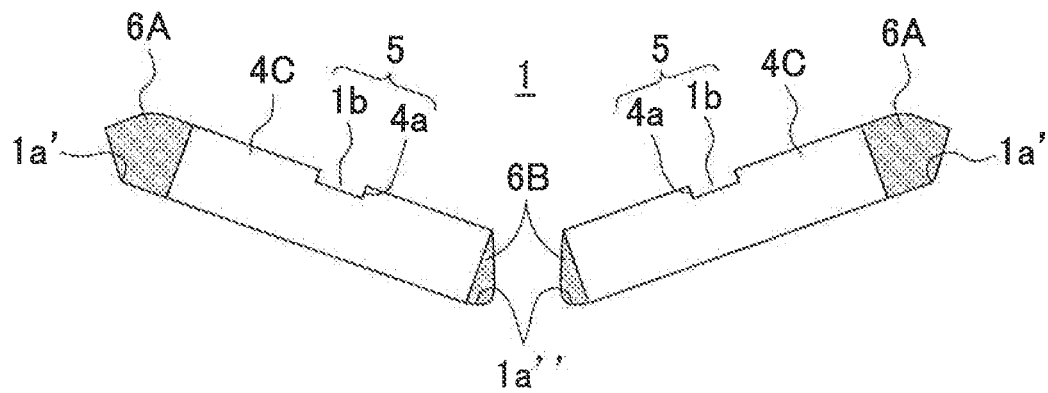
FIGS. 3(a), (b) and (c) are still other embodiments of a slot bored in a rotor and a magnet inserted therein.
Figure 3:
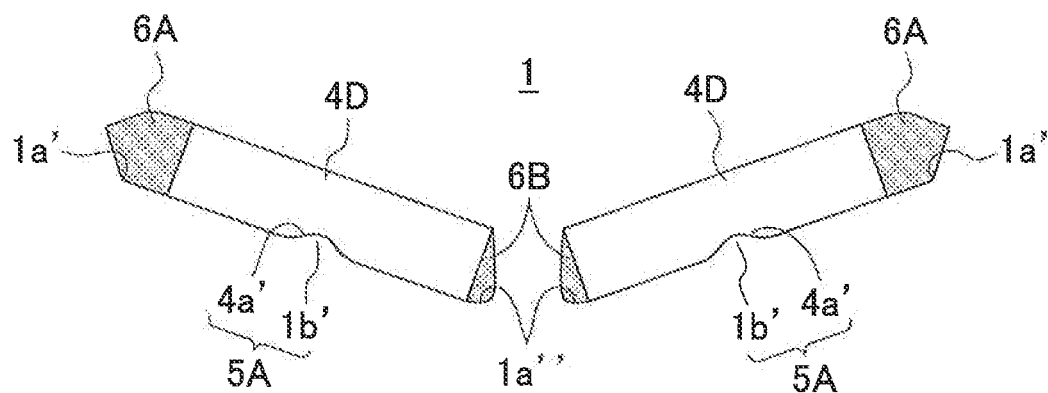
Figure 3:
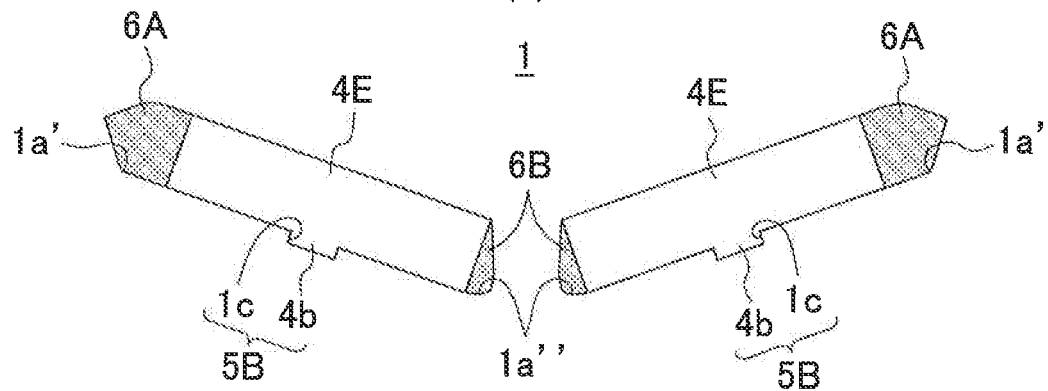
Figure 4:
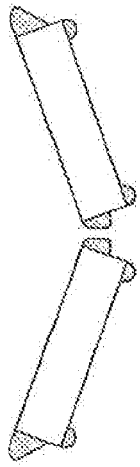
FIG. 4 shows a result of magnetic analysis to find demagnetizing field in a magnet, where
Figure 4:
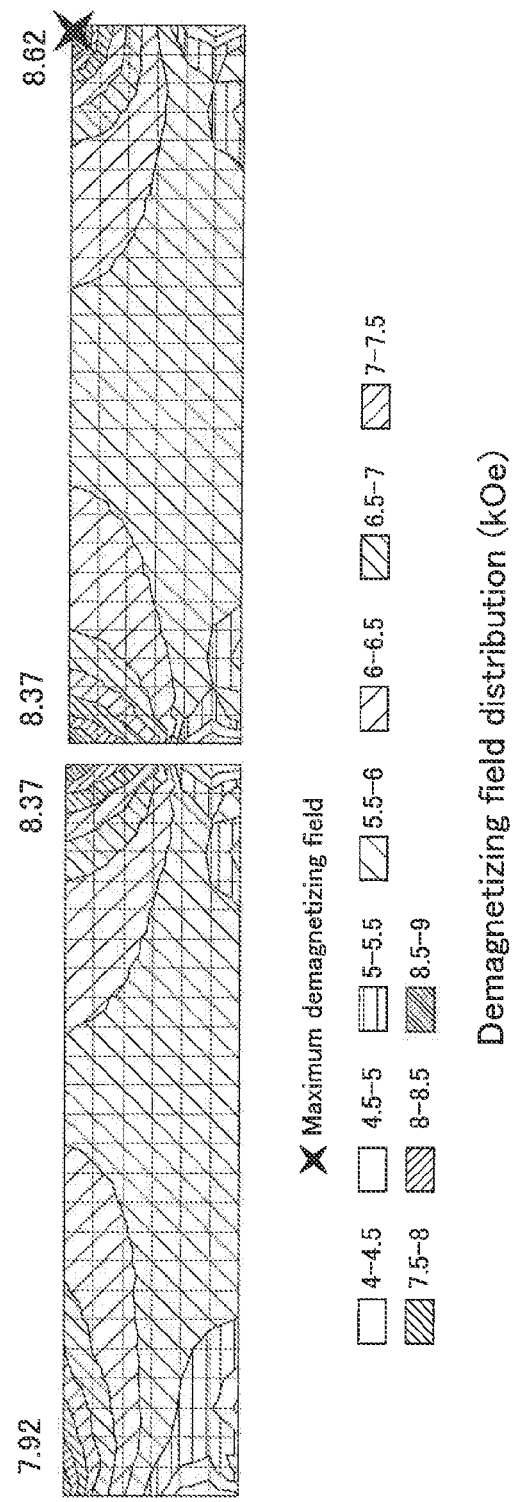
Figure 5:
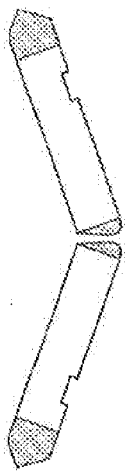
FIG. 5 shows a result of magnetic analysis to find demagnetizing field in a magnet, where
Figure 5:
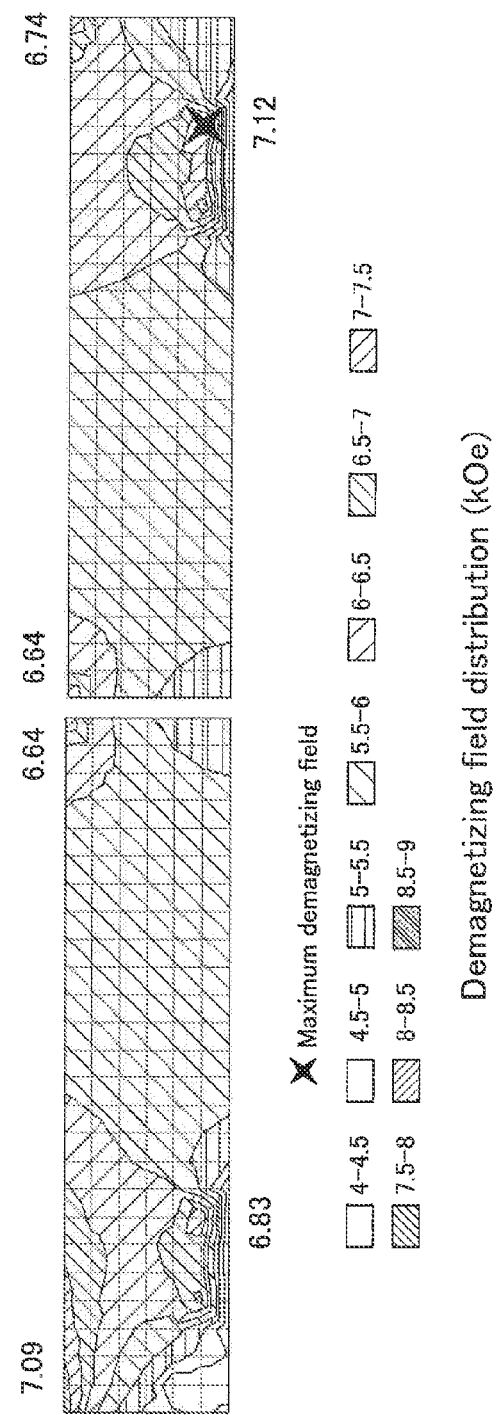
Figure 6:
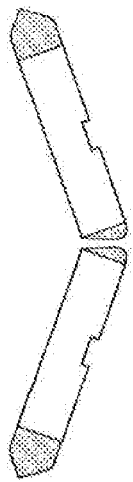
FIG. 6 shows a result of magnetic analysis to find demagnetizing field in a magnet, where
Figure 6:
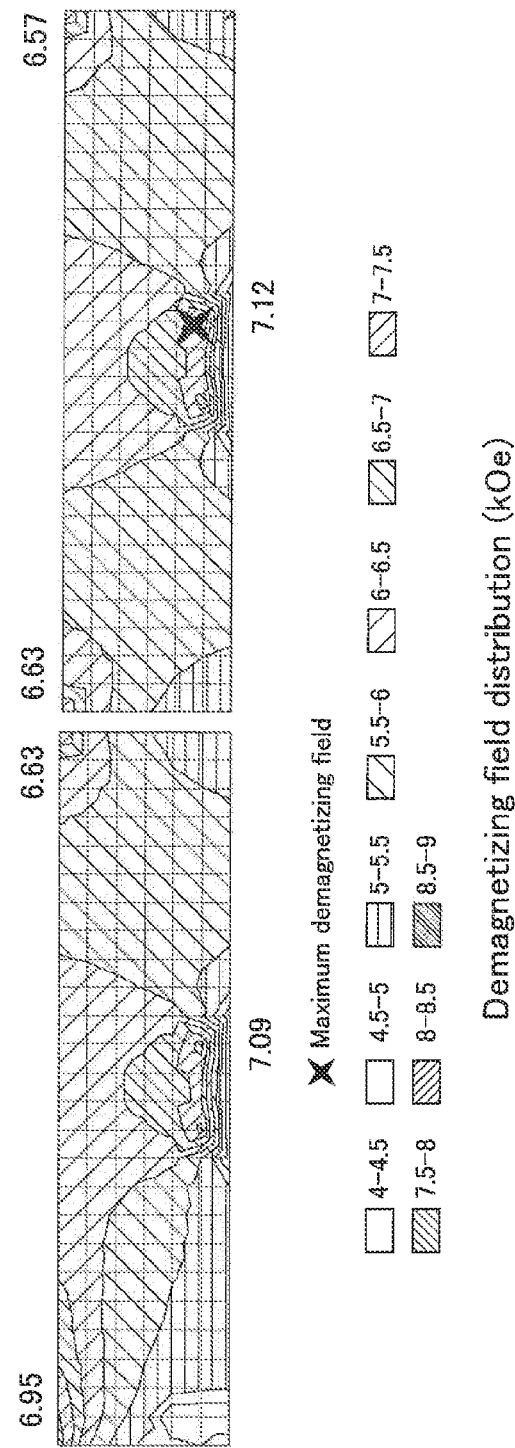
Figure 7:
FIG. 7 shows a result of magnetic analysis to find demagnetizing field in a magnet, where
Figure 7:
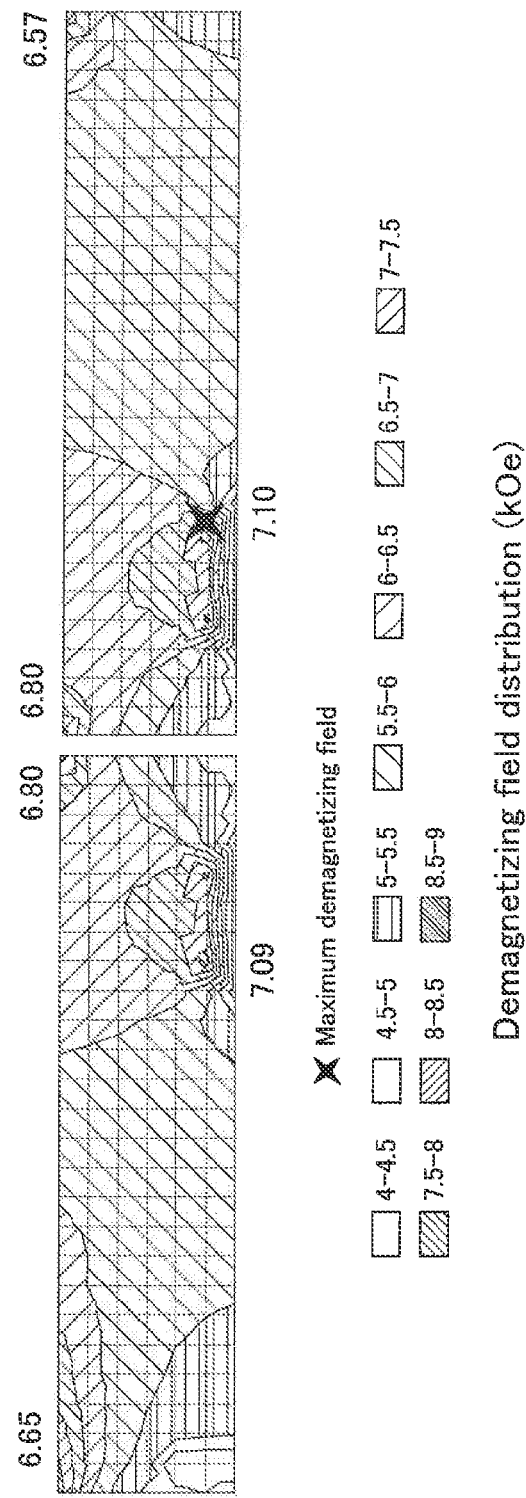

FIGS. 2 and 3 are plan views showing other embodiments of slots bored in a rotor and magnets to be inserted therein.

The embodiment shown in FIG. 2a includes two permanent magnets 4A and concave grooves 4a provided closer to the inner side of the V-letter from the center positions, and with each concave groove 4a is engaged a protrusion 1b of the slot to form an engagement part 5.

The embodiment shown in FIG. 2b includes two permanent magnets 4B and concave grooves 4a provided closer to the outer side of the V-letter from the center positions, and with each concave groove 4a is engaged a protrusion 1b of the slot to form an engagement part 5.

The embodiment shown in FIG. 3a includes two permanent magnets 4C and concave grooves 4a provided on the stator side of these permanent magnets 4C, and with each concave groove 4a is engaged a protrusion 1b of the slot to form an engagement part 5.

The embodiment shown in FIG. 3b includes two permanent magnets 4D and concave grooves 4a' provided at their center positions, the concave grooves 4a' having a substantially semielliptical shape of a smooth curved line in planar view, and with each concave groove 4a' is engaged a protrusion 1b' of the slot having a complementary shape to form an engagement part 5A.

The embodiment shown in FIG. 3c includes two permanent magnets 4E and protrusions 4b provided at their center positions, the protrusions 4b having a rectangular shape in planar view, and with each protrusion 4b is engaged a concave groove 1c of the slot to form an engagement part 5B.

In this way, the concave grooves or the protrusions may be provided at any of the permanent magnet 4 and the slot 1a, or the concave grooves or the protrusions may be provided on any of the faces on the stator side and the faces on the rotor core center side. Further the concave grooves may be located at any of the center position of the permanent magnets 4, the outer position of the V letter and the inner position of the V letter.

[Magnetic Field Analysis and Results Thereof]

The present inventors simulated a permanent magnet model with the V-letter arrangement of the conventional structure (Comparative example) and a permanent magnet model with the V-letter arrangement according to the present invention (Examples 1, 2 and 3) with a computer, and made a magnetic field analysis to find the demagnetizing field in each permanent magnetic model to create their contour figures and find the values of maximum demagnetizing field in these permanent magnetic models and the amount of reduction in demagnetizing filed of Examples 1, 2 and 3 from Comparative example.

The permanent magnet model of Comparative example model had a shape having edges on the lateral sides of the permanent magnet as shown in FIG. 8b and did not have an engagement part for the engagement of the slot and the permanent magnet. On the other hand, the models of Examples 1, 2 and 3 all had flux barriers on the both lateral sides including an area of the same thickness as the thickness of the permanent magnet and had an engagement part provided on the rotor core center side for the engagement of the slot and the permanent magnet. Example 1 had the engagement part closer to the outer side of the V letter from the center position of the permanent magnet, Example 2 had the engagement part at the center position of the permanent magnet and Example 3 had the engagement part closer to the inner side of the V letter from the center position of the permanent magnet.

FIGS. 4, 5, 6 and 7 show the permanent magnet models of Comparative example and Examples 1, 2 and 3, respectively in (a), and the demagnetizing contour figures as their analysis results in (b). In each figure (b), the part indicated with the sign x shows a part of giving maximum demagnetizing field.

The magnet models had a thickness of 0.5 mm and a length of 22 mm in planar view.

The following Table 1 shows the values of maximum demagnetizing field of Comparative example and Examples 1, 2 and 3, and the amount of reduction in demagnetizing filed of Examples 1, 2 and 3 from Comparative example.

TABLE 1

|  | Comp. Ex. | Ex. 1 | Ex. 2 | Ex. 3 |
| --- | --- | --- | --- | --- |
| Maximum demagnetizing field (kOe) | 8.62 | 7.12 | 7.12 | 7.10 |
| Demagnetizing field reduction amount (kOe) | — | −1.50 | −1.50 | −1.52 |

It is found from Table 1 and FIGS. 4 to 7 that Comparative example had large demagnetizing field at both corner areas of the permanent magnet on the stator side, especially at the outer corner area of the V letter, and the maximum demagnetizing field was 8.62 kOe.

On the other hand, in Examples 1 and 2, the values of the maximum demagnetizing field were reduced to 7.12 kOe. In Example 3 having the engagement part on the inner side of the V letter of the permanent magnet, it was demonstrated that the value was further reduced to 7.10 kOe.

Further, in comparison of the contour figures between Comparative example and these Examples, the demagnetizing field tends to concentrate on the part of the engagement parts. This is because the concave groove provided at the permanent magnet makes the distance from the face on the stator side to the concave groove shorter than the thickness of the permanent magnet at the other part, and therefore the flux from the stator likely concentrates on this part, and as a result, the demagnetizing field becomes larger there.

In this way, the engagement part formed at the permanent magnet and the slot of the rotor not only can reduce the demagnetizing field but also changes the demagnetization field distribution in the permanent magnet. A permanent magnet manufactured so as to have coercive force distribution corresponding to this demagnetizing field distribution can minimize the usage amount of dysprosium or the like while providing desired coercive force performance.

This leads to secured performance and quality of a permanent magnet and reduction in the manufacturing cost, which directly leads to secured performance and quality of a rotor including this permanent magnet and an IPM motor including this rotor and reduction in their manufacturing cost.

Although that is a detailed description of the embodiments of the present invention with reference to the drawings, the specific configuration is not limited to the above-stated embodiments, and it should be understood that we intend to cover by the present invention design modifications without departing from the spirits of the present invention.

DESCRIPTION OF REFERENCE NUMBERS

1: Rotor
1a: Slot
1a', 1a": Slot on lateral sides of magnet
1b, 1b': Protrusion
1c: Concave groove
2: Stator
3: Coil
4, 4A, 4B, 4C, 4D, 4E: Magnet (permanent magnet)
4a, 4a': Concave groove
4b: Protrusion
5, 5A, 5B: Engagement part
6A, 6B: Flux barrier (resin)

The invention claimed is:

1. A rotor making up a motor, the rotor comprising: a rotor core with two slots bored therein, the two slots being spaced with each other and in arrangement of a substantially V-letter shape, each slot being a rectangle having short sides and long sides in planar view and having slot faces corresponding to the long sides including a slot face on a center side of the rotor core and a slot face on a stator side facing the slot face on the center side;
at least one of a protrusion and a concave groove disposed at at least one of the slot face on the center side of the rotor core and the slot face on the stator side facing the slot face on the center side;
a magnet to be contained in each slot, the magnet including at least one of a concave groove and a protrusion to be engaged with the protrusion or the concave groove of the slot face;
an engagement part so as to let the slot and the magnet engage at their concave groove and protrusion, the engagement part aligning and fixing the magnet in the rotor to form one magnetic pole with the magnets in arrangement of a substantially V-letter shape; and
a flux barrier in contact with the magnet and disposed between a lateral side face of the magnet and a slot face, the flux barrier having a same thickness as a thickness of the magnet and having a width not less than the thickness of the magnet and smaller than a length in a longitudinal direction of the magnet perpendicular to the thickness, wherein
both of the two magnets in arrangement of a substantially V-letter shape each include the engagement part brought from a center position of the magnet closer to the other magnet.

2. The rotor according to claim 1, wherein the flux barrier includes any one of resin and air.

3. An IPM motor comprising the rotor according to claim 1 and a stator.

* * * * *

UNITED STATES PATENT AND TRADEMARK OFFICE
CERTIFICATE OF CORRECTION

PATENT NO. : 8,729,763 B2  
APPLICATION NO. : 13/809910  
DATED : May 20, 2014  
INVENTOR(S) : Tomonari Kogure et al.

Page 1 of 1

It is certified that error appears in the above-identified patent and that said Letters Patent is hereby corrected as shown below:

On the Title Page, Item (73), in the "Assignee", "Toyota Jidosha Kabushiki Kaisha, Toyota-shi, Aichi-ien, (JP)" should read -- Toyota Jidosha Kabushiki Kaisha, Toyota-shi, Aichi-ken (JP) --.

Signed and Sealed this  
Twenty-first Day of October, 2014

Michelle K. Lee  
*Deputy Director of the United States Patent and Trademark Office*